C. N. LEWIS.
Corn Husker.
No. 18,644. Patented Nov. 17, 1857.
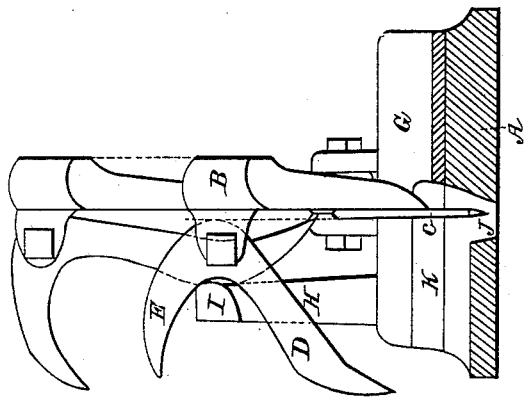
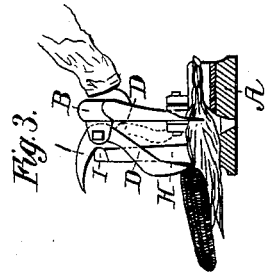
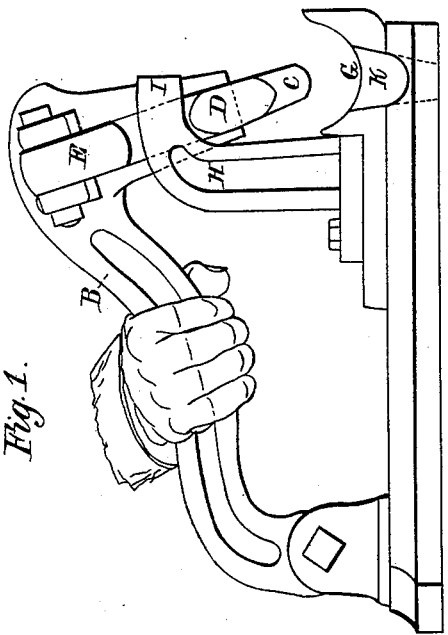

UNITED STATES PATENT OFFICE.

CHARLES N. LEWIS. OF SENECA FALLS, NEW YORK.

CORN-HUSKER.

Specification of Letters Patent No. 18,644, dated November 17, 1857.

*To all whom it may concern:*

Be it known that I, CHARLES N. LEWIS, of Seneca Falls, in the county of Seneca and State of New York, have invented a new and useful Machine for Husking Corn; and I do hereby declare that the following is a full, clear, and exact description of the construction and operation of the same, reference being had to the accompanying drawings, making part of this specification, and to the letters of reference marked thereon.

Figure 1 is a side, and Fig. 2 an end elevation.

Similar letters refer to like parts in each of the figures.

My invention consists of a bed-piece, A, to which is hinged a cast-iron lever, B, to the head of which is attached a chisel-pointed steel blade, C, for severing the ear from the butt. To the side of the head is hinged a wedge-pointed dog, D, with an elbow lever, E. Directly underneath the blade is a concave bed G, for receiving the corn to be husked, by the side of which rises a tripping post, H, having a bent head, I, for operating the dog D by means of the elbow lever E. The concave and bed-piece are mortised through at J, to allow the blade to descend an inch or thereabout below the surface of the bed, and a slot, K, extends from the mortise to the end of the concave. As the lever is raised and dropped by the hand, the dog is operated by the tripping-post as follows: As the lever rises the weight of the dog causes it to drop with its point close to the blade C, as shown in the outline, Fig. 2, but as the lever descends the head of the tripping post H receives the arm E, and by arresting its downward progress throws the dog off, in the position shown. The operation of the blade and dog in descending, therefore, is that of an expanding wedge. Should it fail to return of its own gravity to the vertical position, it is forced to do so in rising to pass by the head of the post I, the form being such as to insure that result.

The process of husking is this:—The lever being raised a stalk of corn is laid in the concave, G, the butt of the ear being directly beneath the blade, or in other words the ear is laid in the slot K, which is a guide to its proper position. The lever is then allowed to descend, and the blade, C, cleaves the ear from the butt. The point of the dog follows so close to that of the blade that it enters the cleft in the manner of a wedge, and immediately receives the impulse given by the elbow lever, which causes it to tilt or throw the ear aside, as seen in Fig. 3, the husk being held in the meantime by the blade. The sudden transverse motion completely denudes the ear of its covering, and throws it from the machine into a basket or other receptacle. The ears do not require to be picked, but are husked from the stalk itself, thus saving a large amount of labor. They may, however, be picked if preferred. The operation is as rapid as it is successful, and the machine is so simple that a child may use it, and it is hardly possible to derange its working parts. Being made almost entirely of cast iron its cost is very inconsiderable, and the absence of all complexity renders it peculiarly adapted for the use of farmers.

It will be seen that the dog, D, by its weight is carried with considerable force against the cutting blade. This tends to remove any husks, &c., which may adhere to the blade, and thus keeps it in good working condition.

What I claim as my invention and desire to secure by Letters Patent, is,

The combination of the operating lever B with the wedge-pointed dog, D, lever E, tripping post, H, blade C, concave G, and slot K; the whole arranged and operating substantially in the manner and for the purpose set forth.

CHARLES N. LEWIS.

Witnesses:
J. FRASER,
S. I. ALLIS.